United States Patent
Romer, Jr.

[11] Patent Number: 5,829,657
[45] Date of Patent: Nov. 3, 1998

[54] TICKET STUB DISPLAY DEVICE AND ARTICLE CARRIER COMBINATION

[76] Inventor: Arthur H. Romer, Jr., 1118 Orchard Way, Silver Spring, Md. 20904

[21] Appl. No.: 874,226

[22] Filed: Jun. 13, 1997

[51] Int. Cl.⁶ ..................................................... A45C 15/00
[52] U.S. Cl. .......................... 224/610; 150/117; 224/612; 224/623; 224/684
[58] Field of Search ................................. 224/610, 602, 224/607, 612, 623, 684; 150/117; D3/303

[56] References Cited

U.S. PATENT DOCUMENTS

| | | | |
|---|---|---|---|
| D. 252,355 | 7/1979 | Uber | D3/48 |
| D. 343,951 | 2/1994 | Petty et al. | D3/249 |
| D. 365,204 | 12/1995 | Chen | D3/215 |
| 1,617,855 | 2/1927 | Lewis | 150/117 X |
| 4,236,559 | 12/1980 | Archbold | 224/610 |
| 4,570,688 | 2/1986 | Williams | 150/134 |
| 4,572,633 | 2/1986 | Burke | 354/82 |
| 5,121,864 | 6/1992 | Geschwind | 224/587 X |
| 5,285,833 | 2/1994 | Haxby | 224/684 X |
| 5,333,768 | 8/1994 | Krentz | 224/623 |
| 5,388,739 | 2/1995 | Gargan | 224/604 |
| 5,687,896 | 11/1997 | Clift | 224/623 X |

*Primary Examiner*—Renee S. Luebke
*Attorney, Agent, or Firm*—Farkas & Manelli, PllC

[57] ABSTRACT

A display device and article carrier combination includes a body having front and rear walls, the walls being connected at side edges and bottom edges thereof thereby defining a pouch having a closed bottom, closed sides and an open top portion. An envelope structure is coupled to and extends generally adjacent to the body. The envelope structure has a front panel and a rear panel. Certain edges of the front panel and the rear panel are joined together so as to define a pocket having an opening in which an article may be inserted. At least one of the panels is transparent such that when disposed in the pocket, the article may be visible through the panel. Suspending structure is coupled to the body and/or the envelope structure and forms a loop such that the combination may be suspended from the neck of a user.

11 Claims, 2 Drawing Sheets

TICKET STUB DISPLAY DEVICE AND ARTICLE CARRIER COMBINATION

BACKGROUND OF THE INVENTION

This invention relates to display devices and article carriers and more particularly to a device to be suspended from a user's neck for carrying an article and having a transparent window for displaying a ticket stub or event pass.

At many sporting events, it is necessary to show a ticket stub or pass to provide proof of seating and/or for re-entry of the grounds where the event is taking place. One such sport is auto racing. Once the ticket holder enters the ground, it is often necessary to show an attendant a ticket stub or pass to enter different venues on the racing grounds. For example, some fans who had purchased access to the pit area must display the ticket stub or pass to enter this area. It becomes a burden to the ticket holder to locate the ticket or pass each time he or she wishes to enter an area that may be off-limits to other ticket holders, or to re-enter the grounds. It may happen that the ticket holder misplaces the stub and therefore may not gain entrance to the area of interest.

While watching auto racing, the ticket holder or fan has the opportunity to listen to race communications via race scanning radios. Some fans prefer to carry binoculars, cameras, sunglasses or other valuable items on their person to enhance their enjoyment. However, these items may be difficult to carry about the grounds in a hands-free manner.

SUMMARY OF THE INVENTION

An object of the invention is to provide a ticket stub display device and article carrier combination for use at a sporting event, concert or other event which may be carried about the neck of the user and arranged such that a ticket stub or pass may be held in a transparent pocket to be easily visible, and a radio, camera, binoculars or other item(s) may be carried in a pouch of the device.

In accordance with the principles of the present invention, this objective is obtained by providing a display device and article carrier combination including a body having front and rear walls, the walls being connected at side edges and bottom edges thereof thereby defining a pouch having a closed bottom, closed sides and an open top portion. An envelope structure is coupled to and extends generally adjacent the body. The envelope structure has a front panel and a rear panel. Certain edges of the front panel and the rear panel are joined together so as to define a pocket having an opening in which an article may be inserted. At least one of the panels is transparent such that when disposed in the pocket, the article may be visible through the panel. Suspending structure is coupled to the body and/or the envelope structure and forms a loop such that the combination may be suspended from the neck of a user.

Another object of the present invention is the provision of a device of the type described which is simple in construction, effective in operation and economical to manufacture and maintain.

These and other objects of the present invention will become apparent during the course of the following detailed description and appended claims.

BRIEF DESCRIPTION OF THE DRAWINGS

The invention may best be understood with reference to the accompanying drawings wherein.

DETAILED DESCRIPTION OF THE PRESENTLY PREFERRED EXEMPLARY EMBODIMENTS

Figure 1:
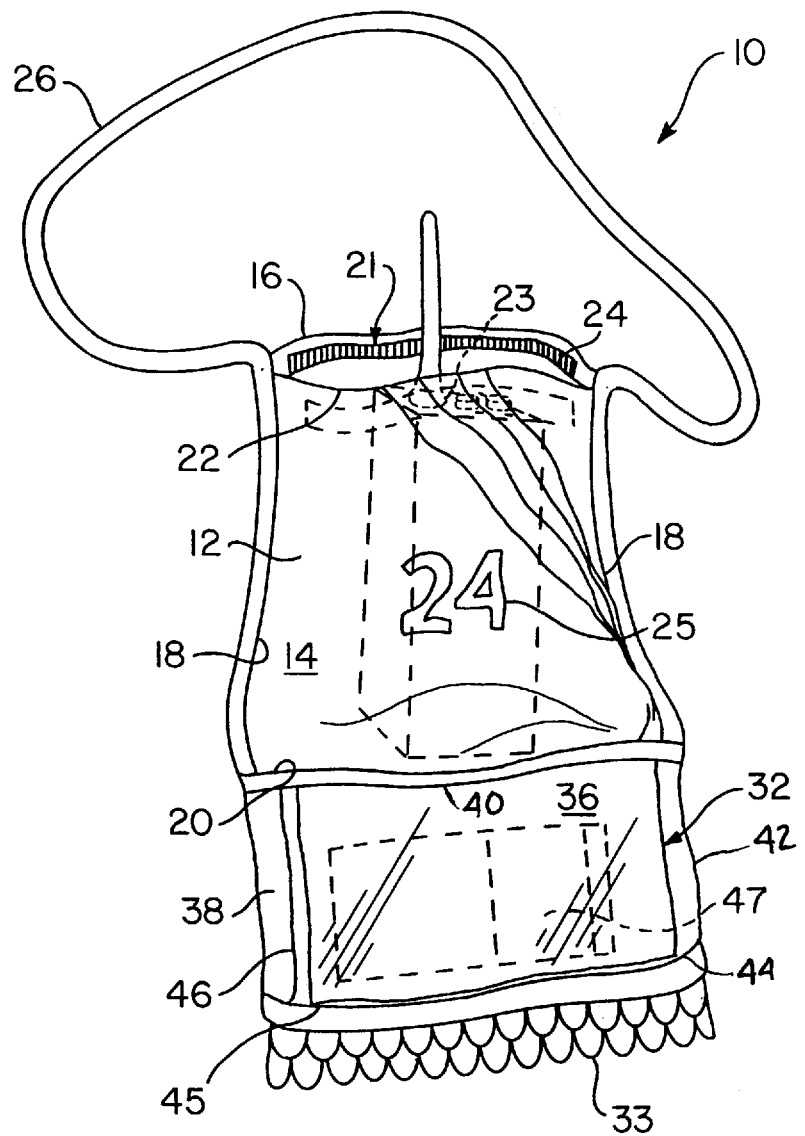
FIG. 1 is a perspective view of a ticket stub display device and article carrier combination provided in accordance with the principles of a first embodiment of the present invention, shown with a scanning radio received in a pouch thereof and a ticket stub received in a transparent envelope thereof.

Referring to the FIG. 1, a portable ticket stub display device and article carrier combination, generally indicated at 10, is shown which embodies the principles of the present invention. As used herein, the term "ticket stub" means a portion of the ticket that must be shown to prove seating at an event, such as a sporting event. It is within the contemplation of the invention that the term "ticket stub" include a pass or the like that is separate from the actual ticket required for entering the grounds of the event.

The combination 10 includes a body 12 having a front wall 14 and an opposing rear wall 16. In the illustrated embodiment, the front and rear walls are made of water-resistant cloth such as nylon and are sewn together at side edges 18 and at bottom edges 20 so as to define a pouch 22 having a closed bottom, closed sides and an open top portion 24. It can be appreciated that the body can be made of any suitable material, such as plastic, whereby the pouch 22 may be formed by thermal welding or the like. Pouch 22 includes closure structure, generally indicated at 21, to provide a means for closing the pouch 22. In the illustrated embodiment, the closure structure 21 includes conventional hook and loop structure disposed in opposing relation on the interior of the pouch 22. It can be appreciated that the hook and loop structure may be provided at any location with respect to the pouch so long as the closing function is possible. A button or snap or the like could be used as closure structure in place of, or in combination with, the hook and loop structure.

The pouch 22 is sized to receive a conventional race scanning radio 23, binoculars or other similarly sized items. In the illustrated embodiment, the pouch 22 is generally six inches deep and six inches wide. The outer surface of the front wall 14 may include machine embroidered indicia 25 thereon to promote the user's favorite team, player, sponsor, race car, etc.

As shown in FIG. 1, a cord 26, defining suspending structure, is made in the form of a loop by connecting the ends thereof to the sides 18 of the body 12, such that the device 10 may accommodate various head sizes and be suspended about a user's neck. The cord 26 is of material such that is may be sewn to the sides 18 of the body 12 and/or to the sides of the envelope structure, generally indicated at 32.

Figure 2:
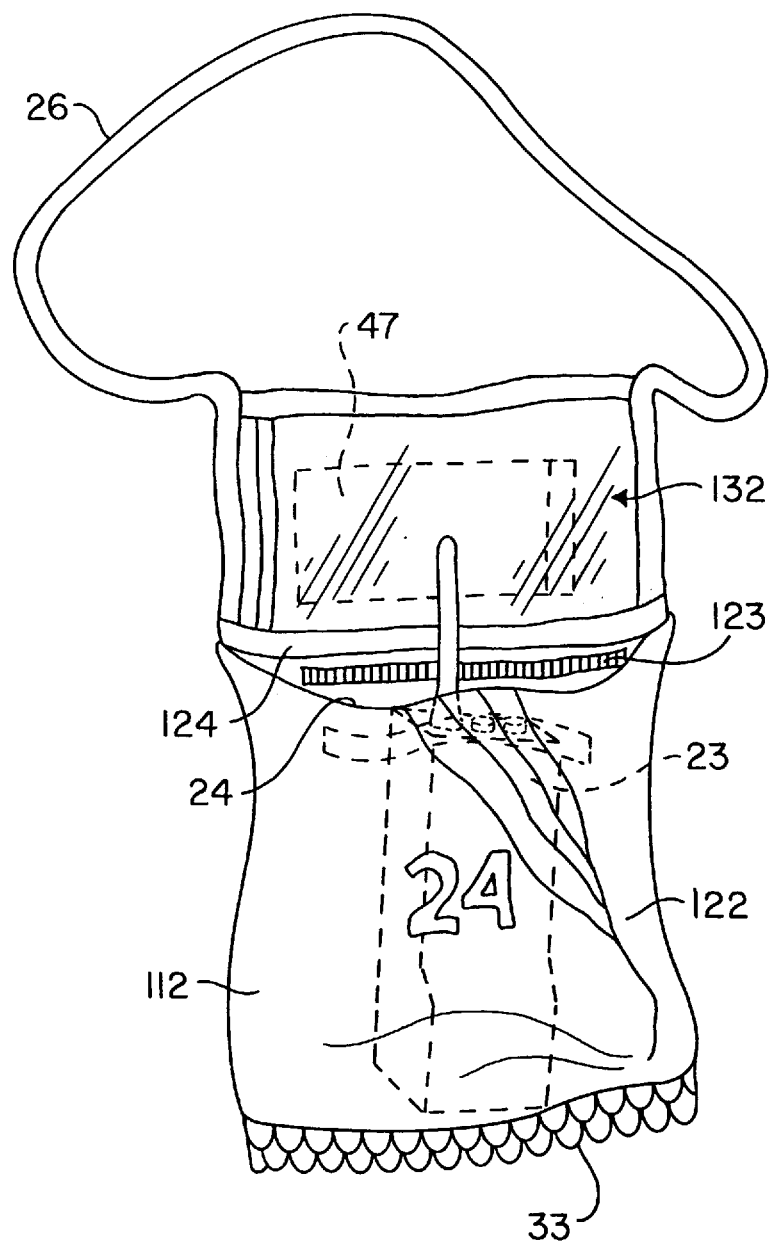
FIG. 2 is a perspective view of a ticket stub display device and article carrier combination provided in accordance with the principles of a second embodiment of the present invention, shown with a scanning radio received in a pouch thereof and a ticket stub received in a transparent envelope thereof.

The envelope structure 32 is disposed directly adjacent to the body 12. The envelope structure comprises a front panel 36 and a rear panel 38 coupled together at upper edges 40, side edges 42 and bottom edges 44 thereof so as to define a pocket 45 having an opening 46 into which a ticket stub 47 may be inserted so as to be displayed. At least the front panel 36 is made from transparent plastic permitting the ticket stub to be visible through the panel when the device 10 is worn by the user to provide proof of seating and/or for re-entry. However, both panels may be transparent if desired. The combination 10 of FIG. 1 is sized and configured such that when disposed about a user's neck, the opening of the pouch 22 is disposed generally at a chest portion of the user and the envelope structure 32 is disposed generally near the waist of the user. In the embodiment of FIG. 1, the upper edges of the envelope structure 32 are connected to the bottom of the body 12 such that the envelope structure is disposed directly below the pouch 22. This provides easy access to the pouch 22. However, with reference to FIG. 2, it can be appreciated that the envelope structure 132 may be disposed above the pouch 122 with an opening 123 of the pouch 122 being generally near a connection 124 between the body 112 and the envelope structure 132. Thus, when suspended from a user's neck the opening of the pouch is disposed lower with respect to the user's chest, as compared with the embodiment of FIG. 1.

Returning to FIG. 1, the envelope structure 32 is connected to the body 12 by sewing. The envelope structure is generally six inches wide and approximately three inches in height. Thus, the envelope structure is generally as wide as the body 12 and together, the envelope structure and body define a unitary, generally rectangular member. Decorative stitching and/or tassels 33 may be provided below the envelope structure 32 to enhance the appearance of the combination 10.

In the illustrated embodiments, the opening 46 of the envelope structure 32 is disposed at a side thereof to reduce the chance of rain entering the envelope. However, it can be appreciated that the opening 46 may be provided near the upper edge thereof. Further, closure structure (not shown) may be associated with the envelope structure 32 to close the opening 46 in a manner similar to that discussed above with respect to closing the pouch 22.

While the invention has been described in connection with what is presently considered to be the most practical and preferred embodiments, it is understood that the invention is not limited to the disclosed embodiments, but, on the contrary, is intended to cover various modifications and equivalent arrangements included within the spirit and scope of the appended claims.

What is claimed is:

1. A combination comprising:

a portable scanning radio; and an article carrier comprising:

a body having front and rear walls, said walls being connected at side edges and bottom edges thereof thereby defining a pouch having a closed bottom, closed sides and an openable top portion capable of being opened an amount sufficient to receive at least a portion of said portable scanning radio, an envelope structure coupled to said body so as to extend generally vertically from said body, said envelope structure having a front panel and a rear panel, certain edges of said front panel and said rear panel being joined together so as to define a pocket having an opening in which a generally planar item may be inserted, at least one of said panels being transparent such that when disposed in the pocket, the item may be visible through said at least one panel, and suspending structure coupled to at least one of said body and said envelope structure to form a loop for suspending said carrier from generally an upper portion thereof, said suspending structure having a length sufficient to suspend said carrier from the neck of a user such that while being suspended, said top portion of said pouch remains accessible permitting said portion of said portable scanning radio to be inserted generally vertically through said top portion when open and into said pouch, with the transparent panel being visible.

2. The combination according to claim 1, wherein said envelope structure is coupled to said closed bottom of said body such that said envelope structure is disposed directly below said body.

3. The combination according to claim 1, wherein said envelope structure is coupled to said top portion of said body such that said envelope structure is disposed directly above said body.

4. The combination according to claim 1, wherein said front panel and said rear panel of said envelope structure are joined such that said pocket opening is disposed at a side portion of said envelope structure.

5. The combination according to claim 1, wherein said front and rear walls of said body are made of water-resistant cloth material and joined by sewing to define said pouch and said suspending structure is a cord having opposing ends, each said end being sewn to a respective side of said body.

6. The combination according to claim 1, wherein said cloth material is nylon.

7. The combination according to claim 1, wherein each of said front and rear panels are formed from plastic material and at least said front panel is a transparent plastic material, said certain edges being joined by sewing.

8. The combination according to claim 1, wherein said front wall of said body includes indicia thereon.

9. The combination according to claim 1, wherein said pouch is approximately six inches deep and approximately six inches wide.

10. The combination according to claim 1, wherein a width of said envelope structure is generally equal to a width of said body.

11. The combination according to claim 1, further comprising closing structure associated with said pouch so as to permit closing of the pouch.

\* \* \* \* \*